Aug. 10, 1943.   G. J. MEYER   2,326,243
SATURATOR
Filed Feb. 24, 1941   2 Sheets-Sheet 1

INVENTOR
GEORGE J. MEYER
BY
Wheeler, Wheeler & Wheeler

INVENTOR
GEORGE J. MEYER
BY
Wheeler, Wheeler & Wheeler

Patented Aug. 10, 1943

2,326,243

UNITED STATES PATENT OFFICE 2,326,243

SATURATOR

George J. Meyer, Milwaukee, Wis., assignor to Geo. J. Meyer Manufacturing Co., Cudahy, Wis., a corporation of Wisconsin Application February 24, 1941, Serial No. 380,388

3 Claims. (Cl. 261—11)

My invention relates to improvements in saturators of the general type used for carbonating liquids.

It is my object to provide efficient means for charging liquids in a storage chamber or reservoir in which a supply may be continuously maintained at substantially maximum charge notwithstanding withdrawals, either intermittent or continuous, and notwithstanding a corresponding infeeding of uncharged liquid to compensate for the withdrawals.

One of my objects is to provide means, operable independently of mechanical agitators, wereby water or other liquid may be almost completely saturated with gases, or with a gas such as carbonic acid gas, while the liquid is entering the storage tank or reservoir.

Further objects of my invention are to provide efficient means for quickly chilling the liquid which is being delivered into the saturator; to provide means whereby the interior of the saturator, including the liquid therein, may at all times be kept at a predetermined low temperature for maximum absorption and retention of gases, whereby infeeding liquid may be efficiently distributed in a thin flowing or cascading stream, having maximum surface exposure for absorption of gases and rejection of heat units; to provide distributors which can be quickly removed, cleansed and replaced in the form of a stack or column of conically inclined plates, corrugated or roughened for cascading purposes, and compactly arranged for alternate infeeding and outfeeding of liquid descending by gravity into the body of stored liquid in the lower portion of the storage chamber; and to provide means whereby the charged and stored liquid may be automatically maintained at a substantially constant level notwithstanding continuous or intermittent withdrawals.

Further objects will be apparent from the following specification describing the preferred embodiment of my invention as shown in the drawings.

Various modifications are contemplated, and the words and terms employed to describe the preferred form are being used for the purpose of description and not of limitation.

In the drawings.

Like parts are identified by the same reference characters throughout the several views.

Figure 2:
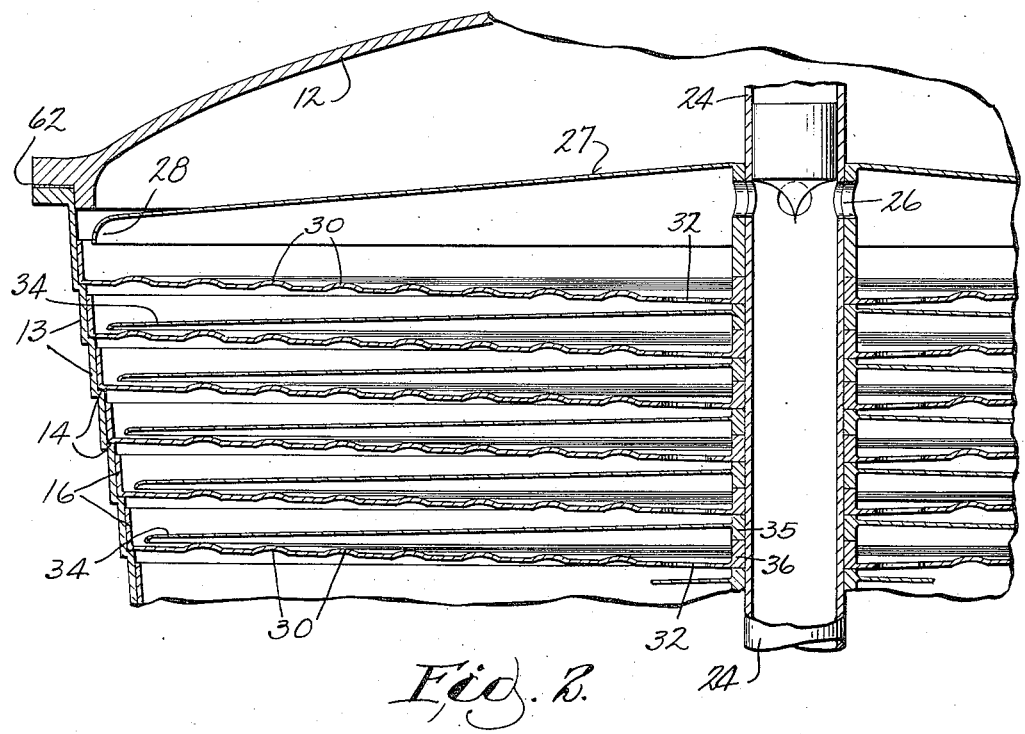
Figure 2 is an enlarged sectional view, in detail, showing the upper portion of the feed pipe, the stack of associated distributor plates and cascading pans, and a fragment of the storage chamber cap.
Figure 3:
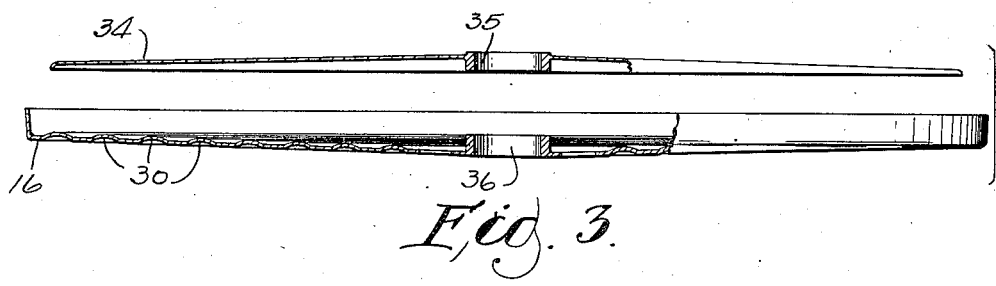
Figure 3 is a sectional view of one of the distributor plates and its associated cascading pan, separated for clearness of illustration, and shown partly in section and partly in elevation.
Figure 4:
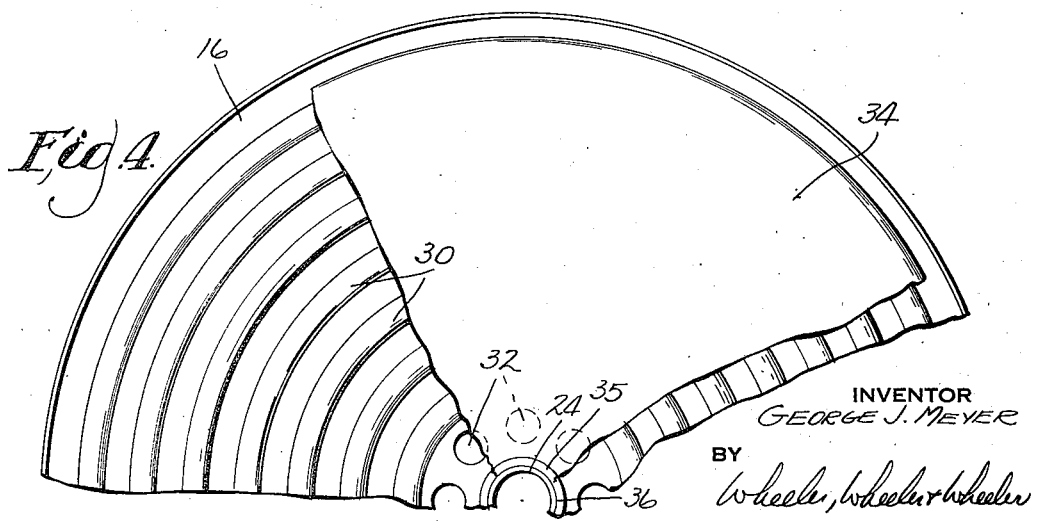
Figure 4 is a fragmentary plan view, with the cap removed, and showing a portion of the upper distributing plate and a larger portion of the associated cascading pan.

A tank 10, adapted to contain a supply of cooling liquid, houses a storage chamber 11 which also serves as a charging container for carbonated or saturated liquids. The storage chamber 11 preferably has the general form of an inverted truncated cone formed of non-corrosive material, such, for example, as stainless steel. The top of the storage chamber may be covered by a cap 12, and the upper portion of the chamber has an annular step formation which subdivides the wall into nearly cylindrical portions 13 of successively smaller diameter in the direction of the lower end. These portions or zones 13 are connected by inwardly extending shelf portions 14, as best shown in Figure 2. These so-called nearly cylindrical portions 13 preferably have a slight downward taper.

The purpose of the shelves 14 is to provide peripheral supports for a series of superposed circular cascading plates or pans 16, the upwardly extending peripheral walls of which are fitted to the inner faces of the wall portions 13.

A liquid feed pipe 20 is elbowed at 21 and coupled to a depending tubular stud 22 in the bottom of the storage tank 11. Stud 22 also extends through the bottom of the tank 10. The passage through this stud 22 registers with that in a vertical pipe 24 extending axially in the storage tank 11 and having its upper end portion connected with the cap 12 at 25.

Near its upper end the pipe 24 is provided with apertures 26 through which liquid may be discharged radially underneath an umbrella-shaped canopy 27. This has a down-turned peripheral margin 28 adapted to distribute and direct the jets of water downwardly into the upper cascading plate or pan 16. The pan bottoms are inwardly and downwardly inclined and provided with a series of annular upwardly extending corrugations 30, over which the liquid cascades while flowing inwardly toward the pipe 24.

Adjacent the pipe 24, each cascading pan is provided with apertures 32 through which the liquid passes to an oppositely inclined distributing plate 34, which again directs it outwardly in the form of a radially expanding sheet of progressively decreasing depth until it flows in a shallow stream or film over the peripheral margin of this plate 34 into the peripheral portion of the next cascading pan 16.

Figure 1:
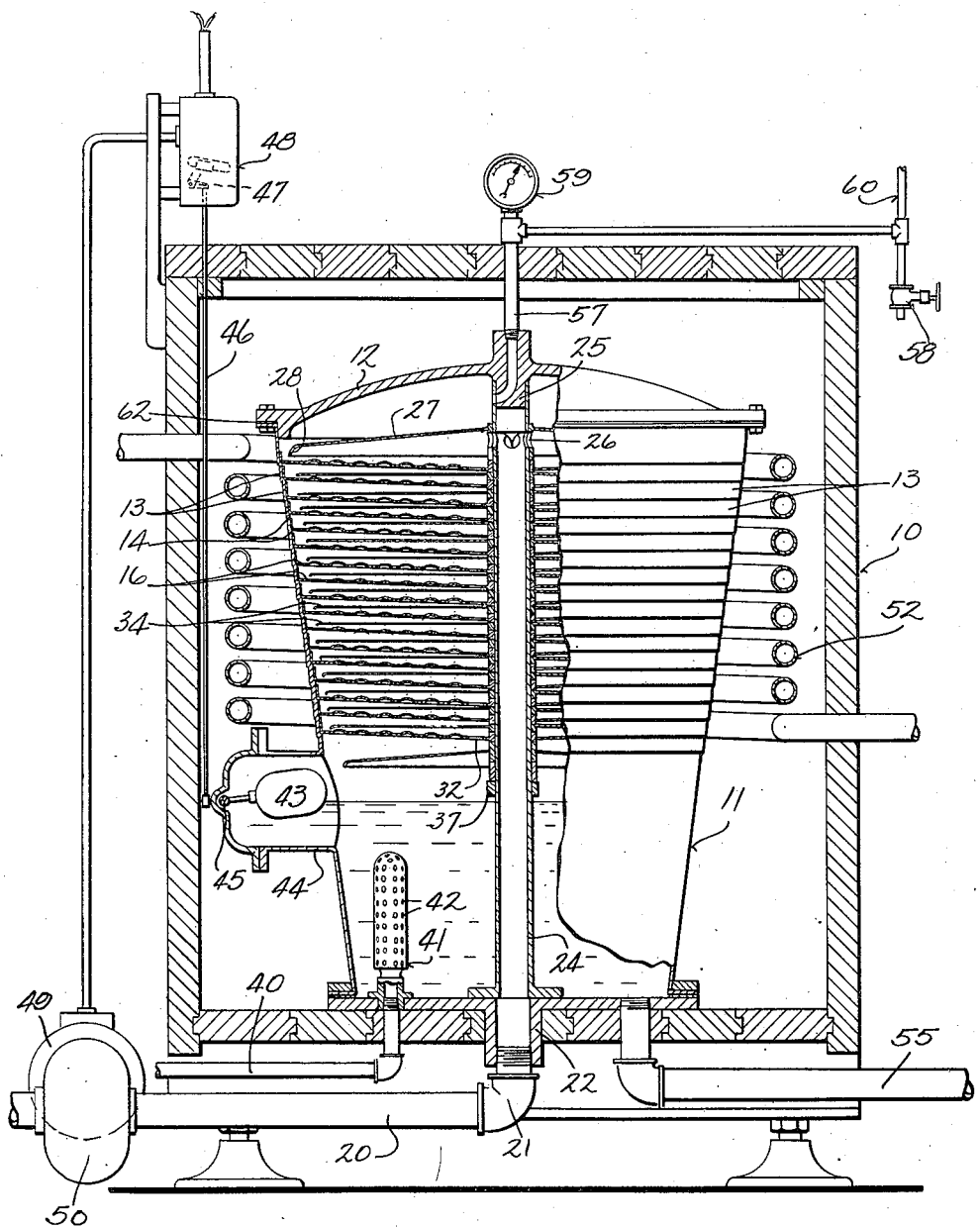
Figure 1 is a vertical sectional view of my improved saturator, drawn to a central plane intersecting the float cavity; the inlet and outlet pipes, the float, and the control mechanism being illustrated in full.

Each of the cascading pans 16 is centrally apertured, and the margin of this central aperture is provided with a collar 36 to be superposed on the collar 35 of its associated plate. These collars 35 and 36 serve as spacers and form a stack encircling the pipe 24 from a stop collar 37, Figure 1, to a point above the nozzle apertures 26. When the cap 12 is removed, the pans and their associated distributing plates may be successively lifted out of the storage chamber 11 to be cleansed, after which they will be replaced in reverse order.

The liquid introduced into the storage chamber through the pipe 20 may be impregnated with gas introduced through a pipe 40 which leads through the bottom of tank 10 and storage chamber 11. Within the storage chamber it is provided with a nozzle head 41 having a multiplicity of small apertures 42. This nozzle head is located below a predetermined liquid level in the tank 11, maintained by means of a float 43 pivotally supported in a float chamber or cavity 44. The float operated pivot shaft 45 extends through the side wall of the float chamber and has an exterior crank arm connected with a vertical rod 46, the upper end of which is attached to a switch lever 47 connected with a switch box conventionally indicated at 48, and which may control the operation of a motor and pump conventionally illustrated at 49 and 50, or a valve if the pipe 20 is connected with a high pressure water supply line.

The interior of the tank 10 is kept at a low temperature by a refrigerating coil 52 which may be connected with any suitable fluid refrigerant. The coil and the storage chamber 11 may be partially or wholly submerged in a body of liquid in the tank 10, whereby such liquid may be maintained at a low temperature, although constantly absorbing heat units from the interior of chamber 11 and its contents.

Carbonated liquid may be drawn from the storage chamber 11 through a service pipe 55, and any air tending to accumulate in the top of the storage chamber may be withdrawn through a pipe or duct 57 leading to the exterior from the space between the cap 12 and the canopy 27.

Discharge of accumulated air may be controlled by a valve at 58. The pressure in the storage chamber may be indicated by a gauge at 59, and when the gas pressure is excessive it may be drawn off through a branch pipe 60, whereby, if desired, it may be returned to the source of gas supply by any suitable means, not shown.

The flow of liquid over the distributing plates and cascading pans may be very turbulent. It will preferably be delivered under considerable pressure through the pipe 24 and its nozzle apertures 26, and will undergo considerable churning before it reaches the initial cascading pan 16. It concentrates while flowing toward the central pipe 24 and is again distributed while flowing radially over the distributing plates 34. It may become of film depth as it nears the peripheries of these plates and passes into the peripheral portions of the associated cascading plates. With this alternate distribution and concentration in a cold atmosphere, rapid absorption of gas is promoted. All gas rising from the surface of the liquid in the storage chamber must pass upwardly through the spaces between the pans and distributing plates in opposition to the liquid flow, and thus the liquid is constantly exposed to these gases while it is being chilled, cascaded, concentrated and redistributed.

The expression "means for cascading" is intended to include any means for promoting turbulence in a stream or sheet of flowing liquid, whereby the particles of liquid are subjected to increased exposure to an atmosphere of gas or air.

It is not essential to my invention that the liquid be caused to flow alternately in an outward direction from a common center or axis and then inwardly toward that axis, it being obvious that similar results can be obtained by causing the liquid to follow a zigzag path along rectangular oppositely inclined platforms. However, the structure disclosed is preferred for the reason that by alternately expanding and concentrating the stream, increased turbulence is obtained as well as an increased exposure of all particles of the liquid to the gases. Considerable churning results from the inward flow of the liquid in the pans 16, particularly as the liquid approaches the central column of collars 35 and 36. This churning effect is increased by the flow of the concentrated liquid through the apertures 32.

It is not regarded as essential that the corrugations be formed in the bottoms of the pans 16, it being obvious that they might be formed in the plates 34 or omitted entirely. I prefer to use them in one of the plates of each pair, since they provide shallow annular pools of liquid, with large surface exposure for gas absorption. Also, by having the convex faces of the corrugations on the upper side, the liquid tends to film over them into the next annular pool, thus increasing the exposure to the gaseous atmosphere. Since each of the pans has its peripheral wall fitted to a portion 13 of the chamber wall, heat conduction into the surrounding tank liquid will be very rapid.

The chamber 11 may be gas-tight, the cap 12 being clamped in position with an interposed gasket 62. Therefore, any desired gas pressure may be maintained within the chamber 11, both gas and liquid being introduced from any suitable source of supply under pressure. By introducing the gas in multiple small jets underneath the level of the liquid in chamber 11, completion of the saturating process is assured, the jets tending to agitate and circulate the liquid in the presence of the gas.

Operation of the system will ordinarily be intermittent. Therefore the stack of pans and distributing plates, together with the annular pools of liquid, retained in the pans by the corrugations, will be reduced in temperature to substantially that of the liquid in which the saturator chamber is submerged. Also, said annular pools of liquid will have a prolonged exposure to the gaseous atmosphere during the intervals when fresh liquid is not being introduced. The fresh liquid will tend to displace the liquid in the annular pools, and if the quantity is large, some of the fresh liquid will enter that in the bottom portion of the chamber. The quantity withdrawn during any given period will, of course, determine the quantity to be introduced.

The fresh liquid may also have a tendency to momentarily raise the temperature of the pans and plates over which it passes, but in so doing the liquid will become reduced in temperature and the heat units will be rapidly withdrawn into the surrounding liquid. Therefore it is important that the surrounding liquid be in continuous physical contact with the heat conducting walls of the container 11, and that means be provided for maintaining the outer body of liquid at a low temperature by means such as the chilling unit represented by the coil 52.

I claim:

1. A saturator comprising the combination with an upright container, having an axially disposed feed pipe with outlets near its top portion, and a service pipe leading from the bottom portion of the container, of a series of annular distributing plates encircling said pipe and having a slight frusto-conical pitch for radial distribution of liquid in a sheet-like film of progressively decreasing depth, a series of intermediate liquid receiving downward and inwardly inclined annular pan-like plates each extending from the wall of the container underneath the outer margin of one of the distributing plates and apertured along their lower margins, float means for controlling the admission of liquid through said pipe to maintain a substantially constant level in the lower portion of the container, means for delivering and distributing gas into and through liquid accumulating in the bottom portion of the container to maintain a gas-charged atmosphere under pressure in the space occupied by said plates, and means for keeping the accumulated liquid at a substantially constant low temperature, for maximum absorption of the infeeding gas.

2. A saturator comprising the combination of a liquid holding tank provided with refrigerating means including a chilling unit, a downwardly tapered saturator chamber in said tank adapted to contain gas under pressure, a gas supply pipe having a distributing nozzle in the lower portion of said chamber, a liquid supply pipe having an outlet in the upper portion of said chamber, a service pipe leading from the lower portion of the chamber, a column of paired oppositely pitched radially outfeeding and inwardly collecting baffle plates in the upper portion of said chamber, the upper member of each pair being outwardly and downwardly pitched, with its outer margin adjacent the outer margin of the lower member of the pair, and the lower member of each pair having its outer margin fitted to the chamber wall and having apertures near the axis of the chamber through which gas may pass upwardly and liquid may pass downwardly, said upper member being adapted to confine upwardly flowing gas to a radially flowing sheet-like stream of progressively decreasing thickness in proportion to its radial expansion over the descending liquid, and float means for controlling the admission of liquid to maintain a substantially constant level in the chamber above the gas distributing nozzle regardless of the rate of liquid withdrawal.

3. A saturator as set forth in claim 2, in which the saturator chamber has the form of the inverted frustrum of a cone, adapted for concentration of liquid in its lower portion and with progressive increasingly wide distribution of liquid and gas over the baffle plates in the upper portion.

GEORGE J. MEYER.